United States Patent [19]

Imamura

[11] 4,227,133
[45] Oct. 7, 1980

[54] STABILIZED SERVO MOTOR POSITIONING APPARATUS

[75] Inventor: Tomoatsu Imamura, Tokyo, Japan

[73] Assignee: Ricoh Company, Ltd., Tokyo, Japan

[21] Appl. No.: 63

[22] Filed: Jan. 2, 1979

[30] Foreign Application Priority Data

Jan. 10, 1978 [JP] Japan ................................. 53-1241

[51] Int. Cl.² .............................................. G05B 5/01
[52] U.S. Cl. ................................. 318/616; 318/640; 318/313
[58] Field of Search ............... 318/640, 616, 617, 618, 318/313, 328; 250/231 SE

[56] References Cited

U.S. PATENT DOCUMENTS

| | | | |
|---|---|---|---|
| 3,839,665 | 10/1974 | Gabor | 318/616 |
| 4,156,169 | 5/1979 | Imamura | 318/640 X |
| 4,160,200 | 7/1979 | Imamura et al. | 318/640 X |

*Primary Examiner*—B. Dobeck
*Attorney, Agent, or Firm*—David G. Alexander

[57] ABSTRACT

A photoelectric transducer (14) produces first and second periodic signals (A), (B) which are 90° out of phase with each other in response to rotation of a servo motor shaft (12a). The first and second signals (A), (B) are differentiated, directly full wave rectified and summed to produce a velocity signal (Vw+), (Vw−) having a magnitude proportional to the rotational velocity of the shaft (12a). The peaks of the first and second signals (A), (B) are detected to produce a reference signal (Vr) having a magnitude corresponding thereto. The magnitude of the reference signal (Vr) is reduced in accordance with the difference between the present position of the shaft (12a) and a command position to produce a velocity command signal (Vc+), (Vc−). The velocity signal (Vw+), (Vw−) is compared with the velocity command signal (Vc+), (Vc−) to produce a drive signal corresponding to the difference therebetween which is applied to the motor (12). Fluctuations in the amplitude, D.C. component and phase of the first and second signals (A), (B) affect the reference signal (Vr) and the velocity signal (Vw+), (Vw−) equally and are thereby cancelled out.

4 Claims, 5 Drawing Figures

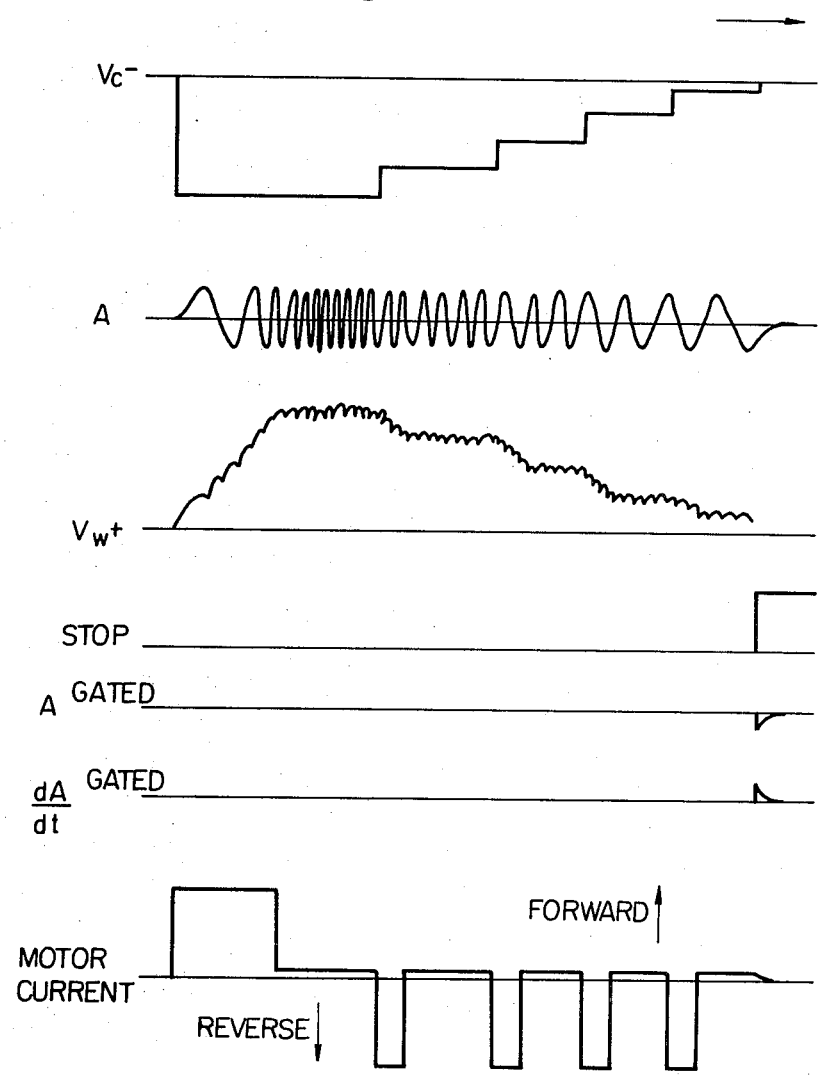

STABILIZED SERVO MOTOR POSITIONING APPARATUS

BACKGROUND OF THE INVENTION

The present invention relates to a servo motor positioning system which may be used in any application in which it is required to accurately move a rotational load from a present position to a desired or command position.

An apparatus for producing an actual motor shaft angular velocity signal for use in such a system is disclosed in U.S. Pat. No. 3,819,268 entitled "VELOCITY DETERMINATION WITH OPTOELECTRONIC LINEAR POSITION TRANSDUCER." In one embodiment of this prior art apparatus a photoelectric transducer produces first and second periodic signals which are 90° out of phase with each other in response to rotation of a servo motor shaft. The first and second signals are differentiated, full wave rectified and summed to produce a velocity signal having a magnitude proportional to the rotational velocity of the shaft. Full wave rectification is accomplished using gating signals derived from either the first and second signals or the differentiated versions thereof by means of voltage comparators.

This system is clearly advantageous over yet prior systems in which position signals are produced by a photoelectric transducer and a velocity signal is produced by a tachometer since the mechanical inertia of the components driven by the motor shaft is reduced and the response time is decreased. Also, the high cost of an electromagnetic tachometer is eliminated since the tachometer is replaced by low cost electronic circuitry.

The velocity signal produced in this manner is utilized in a servo positioning system by comparing the velocity signal with a velocity command signal which corresponds to the present angular distance between the actual motor shaft position and the command position. The difference between the velocity and velocity command signals is sensed to produce a difference signal which is applied to the motor.

While such a system is advantageously operable and provides generally acceptable service, the precision of operation thereof has been heretofore limited. The main problem involved is that the magnitude of the velocity signal is subject to variation in response to changes in the A.C. amplitude, D.C. component level and phase of the first and second signals produced by the transducer.

This problem is compounded by the voltage comparators used to produce the gating signals which typically comprise Schmitt trigger circuits. This is because the magnitude of the velocity signal is influenced not only directly as mentioned above but also indirectly since variations in the first and second signals also affect the relative trigger points in the comparators.

SUMMARY OF THE INVENTION

A servo positioning apparatus embodying the present invention includes a servo motor having a rotary shaft, transducer means for producing first and second periodic signals in response to rotation of the shaft, the first and second signals being substantially 90° out of phase with each other, first and second differentiating means for differentiating the first and second signals, first and second full wave rectifying means for rectifying the differentiated first and second signals and summing means for summing the differentiated and rectified first and second signals to produce a velocity signal having a magnitude corresponding to a rotational velocity of the shaft. Position command means generate a position signal having a magnitude corresponding to difference between a present shaft position and a command shaft position. Reference means sample peaks of the first and second signals and produce a reference signal having a magnitude corresponding thereto. Velocity command means reduce the magnitude of the reference signal in accordance with the magnitude of the position signal to produce a velocity command signal. Comparator means compare the velocity signal with the velocity command signal and produce a motor drive signal corresponding to a difference therebetween, the motor being energized for shaft rotation by the drive signal.

It is an object of the present invention to provide a servo positioning apparatus which operates with substantially greater precision than comparable apparatus known heretofore.

It is another object of the present invention to provide a servo positioning apparatus which is free from adverse influences in the A.C. amplitude, D.C. component level and phase of position signals produced therein.

It is another object of the present invention to provide a servo positioning apparatus which provides a much more accurate velocity signal than apparatus known heretofore.

It is another object of the present invention to provide a servo positioning apparatus which may be produced economically on a commercial production basis.

It is another object of the present invention to provide a generally improved servo positioning apparatus.

Other objects, together with the foregoing, are attained in the embodiment described in the following description and illustrated in the accompanying drawing.

BRIEF DESCRIPTION OF THE DRAWING

FIGS. 4 and 5 are graphs illustrating the operation of the present apparatus.

DESCRIPTION OF THE PREFERRED EMBODIMENT

While the servo positioning apparatus of the present invention is susceptible of numerous physical embodiments, depending upon the environment and requirements of use, substantial numbers of the herein shown and described embodiment have been made, tested and used, and all have performed in an eminently satisfactory manner.

Figure 1:
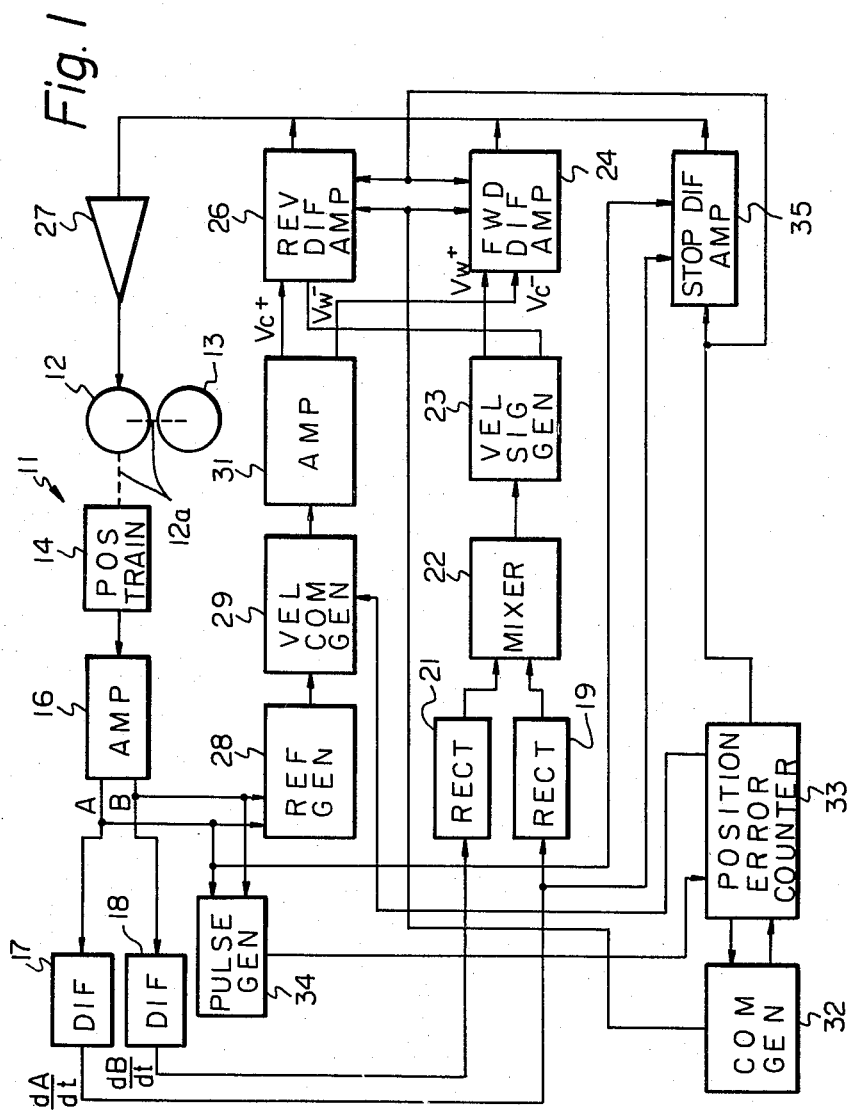
FIG. 1 is a block diagram of a servo positioning apparatus embodying the present invention.

Referring now to FIG. 1 of the drawing, a stabilized servo positioning apparatus embodying the present invention is generally designated by the reference numeral 11 and comprises a servo motor 12. The servo motor 12 has a rotary shift 12a which is connected to drive a load 13. The shaft 12a is also connected to a position signal transducer 14 which is typically of the photoelectric type. Although not illustrated in detail, the transducer 14 generally comprises a disc mounted on the shaft 12a for integral rotation therewith. The disc is opaque and formed with a plurality of circumferentially spaced transparent or translucent slots. A light source and two photosensors are fixedly mounted on opposite sides of the disc so that light from the light source passing through the slots of the disc is incident on the photosensors. Upon rotation of the shaft 12a and disc, the photosensors are alternately uncovered by the slots and covered by the areas between the slots to generate periodic position signals upon rotation of the disc. The photosensors are mounted in a circumferentially spaced manner such that the position signals are generated 90° out of phase with each other. The waveforms of the position signals, designated as A and B in the drawing, may be sinusoidal, sawtooth, triangular or any other desired shape.

The signals A and B are fed through an amplifier 16 to differentiators 17 and 18 which differentiate the signals A and B to produce differentiated signals dA/dt and dB/dt respectively. Whereas the amplitudes of the signals A and B are constant at all angular rotational speeds of the shaft 12a, the amplitudes of the signals dA/dt and dB/dt are proportional to the rotational speed.

Figure 4:
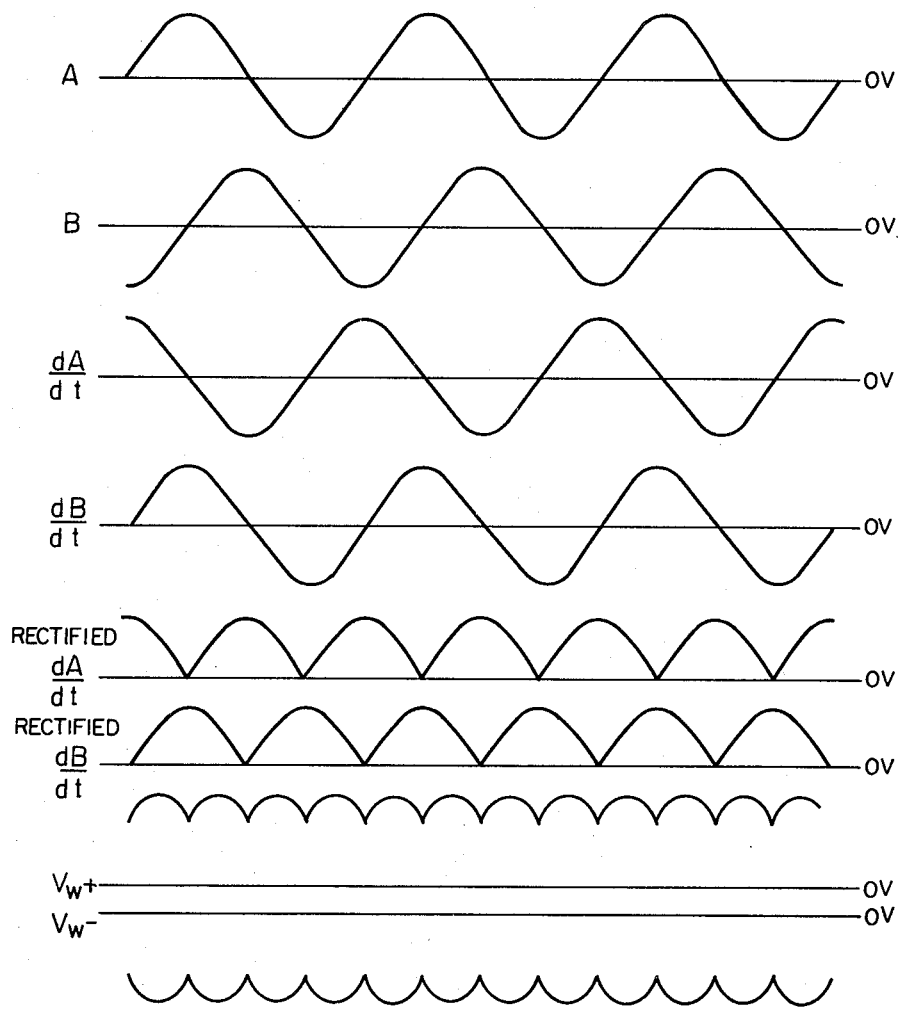

The signals dA/dt and dB/dt are fed through full wave rectifiers 19 and 21 to a mixer 22 which adds or sums the rectified signals. As illustrated in FIG. 4, the output voltage of the mixer 22 will never be zero since the two full wave rectified signals are summed with each other and there is no point at which both full wave rectified signals are simultaneously zero.

The output of the mixer 22 is fed to a velocity signal generator 23 which produces forward and reverse actual velocity signals Vw+ and Vw− respectively in response thereto. The signal Vw+ is an amplified version of the output signal of the mixer 22. The signal Vw− is identical to the signal Vw+ but of inverted polarity. The velocity signals Vw+ and Vw− appear as ripple signals having peaks and average values proportional in magnitude to the actual angular velocity of the shaft 12a.

Due to the fact that the half cycles of the signals dA/dt and dB/dt are effectively added together at intervals of 45°, the average values of the signals Vw+ and Vw− are larger in magnitude than the ripple components. This makes the signals Vw+ and Vw− advantageous for use as velocity signals in the apparatus 11. It will be further noted that the signals dA/dt and dB/dt are directly full wave rectified by the rectifiers 19 and 21, which may comprise diode bridges or the like.

The signal Vw+ is fed to a forward differential amplifier 24 and the signal Vw− is fed to reverse differential amplifier 26. The outputs of the amplifiers 24 and 26 are selectively connectable through an amplifier 27 to the motor 12 as will be described in detail below.

The signals A and B are also fed to a reference signal generator 28 which samples the peaks of the signals A and B and produces a reference signal having a magnitude corresponding thereto. The reference signal from the generator 28 is fed to a velocity command signal generator 29. The output of the generator 29 constitutes a velocity command signal which is fed through an amplifier 31 to inputs of the amplifiers 24 and 26. The amplifier 31 produces a reverse velocity command signal Vc+ which is fed to the amplifier 26 and is an amplified version of the velocity command signal from the generator 29. The amplifier 31 also produces a forward velocity command signal Vc− which is identical to the signal Vc+ but inverted in polarity and is fed to the amplifier 24.

The distance between the present position of the shaft 12a and the command or desired future position thereof is set into a command signal generator 32. The generator 32 is connected to a position error counter 33 which counts the number of steps from the present position to the command position. A pulse generator 34 generates pulses in response to the signals A and B which are fed to the counter 33 to decrement the same. Outputs of the counter 33 are connected to the velocity command signal generator 29 and a stop differential amplifier 35. The amplifier 35 is also connected to receive the signals A and dA/dt. Outputs of the command signal generator 32 and amplifier 35 are connected to inputs of the amplifiers 24 and 26.

In operation, the desired distance for rotation of the shaft 12a is set into the generator 32 and therefrom into the counter 33. The generator 32 further generates a signal indicating forward or reverse rotation which is fed to the amplifiers 24 and 26. For forward rotation the command signal generator 32 enables the amplifier 24 and de-energizes the amplifier 26. For reverse rotation the generator 32 enables the amplifier 26 and disables the amplifier 24.

With reference being made to FIG. 5, and assuming foward rotation, it will be understood that the amplifier 24 is enabled and that the number of steps for rotation of the shaft 12a is set into the counter 33. The output of the counter 33 is fed to the velocity command generator 29 which generates the velocity signal as a function of the distance of the motor shaft 12a from the present position to the command position. The larger the distance the larger the magnitude of the velocity command signal. In other words, the magnitude of the velocity command signal is progressively reduced as the shaft 12a approaches the command position.

Although the amplifier 31 produces both signals Vc+ and Vc− only the forward velocity command signal Vc− is used. As described hereinabove the signals A and B are differentiated, rectified and summed to produce the actual velocity signals Vw+ and Vw−, with only the signal Vw+ being used for forward rotation. The magnitude of the signal Vw+ (peak or average value) is proportional to the actual velocity of the shaft 12a. The signal Vw+ is algebraically added to the signal Vc+ by the amplifier 24 and a motor drive signal proportional to the difference between the signals Vw+ and Vc− applied to the motor 12 through the amplifier 27. The motor current is proportional to the magnitude of the drive signal.

The polarity of the signal Vw+ is positive whereas the polarity of the signal Vc− is negative. When the actual velocity equals the command velocity the signals Vw+ and Vc− will be equal in magnitude and will cancel to produce a zero drive signal. At the beginning of movement of the shaft 12a the actual velocity is zero and the command velocity is high. Thus, the signal Vc− will have a high value and the amplifier 24 will produce a large negative signal for driving the motor shaft 12a in the forward direction. As the shaft speed increases and overshoots the command speed, the signal Vw+ will be larger than the signal Vc− and the amplifier 24 will produce a positive signal to energize the motor 12 in the reverse direction and decelerate the shaft 12a. These operations are illustrated in FIG. 5.

For reverse rotation the signals Vw− and Vc+ are used rather than the signals Vw+ and Vc−.

The generator 34 produces position pulses derived from the signals A and B. One position pulse is generated for each angular rotational step of the shaft 12a and decrements the counter 33. The progressively decreasing count in the counter 33 causes the magnitude of the signals Vc+ and Vc− to decrease thereby progressively commanding a lower shaft speed.

When the shaft 12a is within a small distance from the command position the counter 33 generates a stop signal which energizes the amplifier 35 and de-energizes the amplifiers 24 and 26. In response to the stop signal the signals A and dA/dt are algebraically added together and gated through the amplifier 35 to the motor 12 via the amplifier 27. This has the effect of braking the shaft 12a to a stop in exactly the command position.

As will be understood from further description, the reference signal generator 28 samples the peaks of the signals A and B and produces a reference signal which corresponds thereto. Any variations in the signals A and B affect the reference signal and thereby the command velocity signals Vc+ and Vc− in the same manner as the actual velocity signals Vw+ and Vw−. Thus, such fluctuations are automatically cancelled out and do not affect the operation of the apparatus 11. This enables a substantial increase in the stability and precision of operation of the apparatus 11 over the prior art.

Figure 2:
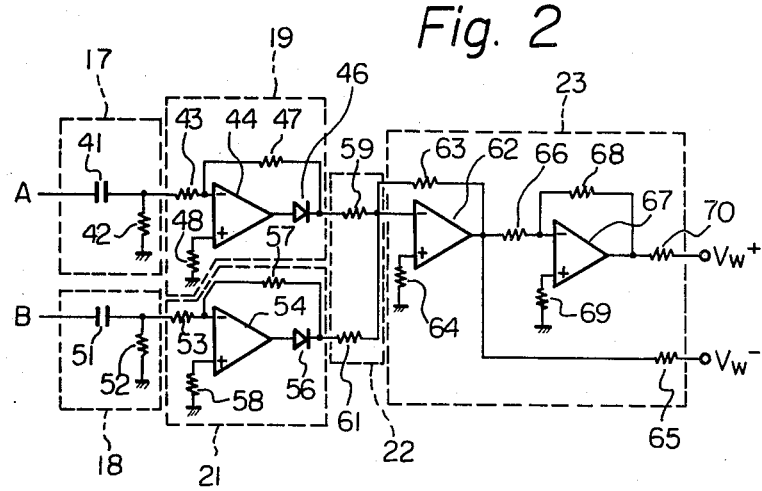
FIG. 2 is an electrical schematic diagram of differentiating, rectifying and actual velocity signal generating means of the present apparatus.

Referring now to FIG. 2 it will be seen that the differentiator 17 comprises a capacitor 41. One end of the capacitor 41 is connected to receive the signal A and the other end of the capacitor 41 is grounded through a resistor 42. The junction of the capacitor 41 and resistor 42 is connected through an input resistor 43 to the inverting input of an operational amplifier 44 of the rectifier 19. The output of the operational amplifier 44 is connected to the anode of a diode 46, the cathode of which is connected through a feedback resistor 47 to the inverting input of the amplifier 44. The non-inverting input of the operational amplifier 44 is grounded through a resistor 48.

The differentiator 18 comprises a capacitor 51 connected at one end thereof to receive the signal B. The other end of the capacitor 51 is grounded through a resistor 52. The junction of the capacitor 51 and resistor 52 is connected through an input resistor 53 to the inverting input of an operational amplifier 54 of the rectifier 21. The output of the operational amplifier 54 is connected to the anode of a diode 56, the cathode of which is connected through a feedback resistor 57 to the inverting input of the operational amplifier 54. The non-inverting input of the operational amplifier 54 is connected to ground through a resistor 58.

The cathodes of the diodes 46 and 56 are connected through resistors 59 and 61 of the mixer 22 to the inverting input of an operational amplifier 62 of the velocity signal generator 23. The output of the operational amplifier 62 is connected to the inverting input thereof through a feedback resistor 63. The non-inverting input of the operational amplifier 62 is grounded through a resistor 64.

The output of the operational amplifier 62 is fed through a resistor 65 to constitute the signal Vw− and is applied through an input resistor 66 to the inverting input of an operational amplifier 67. The output of the operational amplifier 67 is connected to the inverting input thereof through a feedback resistor 68. The non-inverting input of the operational amplifier 67 is grounded through a resistor 69.

The signal A is differentiated by the differentiator 17 in a known manner. During the positive half cycles of the differentiated signal A the operational amplifier 44 produces a negative output which reverse biases the diode 46. This has the effect of disconnecting the operational amplifier 44 from the rest of the circuit. The time constant Tp for differentiation of the positive half peaks of the differentiated signal A is $$Tp = C41 \left[ \frac{R42 \times (R43 + R47 + R59)}{R42 + (R43 + R47 + R59)} \right]$$

where the prefix R designates the resistance value of the resistor designated by the suffixed reference numeral and C41 is the capacitance value of the capacitor C41.

During the negative half cycles of the differentiated signal A the operational amplifier 44 produces a positive output which forward biases the diode 46 and connects the operational amplifier 44 to the rest of the circuit. The time constant Tn for differentiation of the negative half cycles of the signal A is $$Tn = C41 \left( \frac{R42 \times R43}{R42 + R43} \right)$$

and the amplification factor of the operational amplifier 44 is R47/R43. In this manner the signal A is differentiated and full wave rectified and applied to the operational amplifier 62 through the resistor 59. The signal B is differentiated and full wave rectified in an identical manner by the differentiator 18 and rectifier 21 and applied to the operational amplifier 62 through the resistor 61. The operational amplifier 62 is connected as a summing amplifier and sums the two signals at its inverting input. The resulting signal is fed through the resistor 65 to constitute the signal Vw−. The output of the operational amplifier 62 is inverted by the operational amplifier 67 and fed through a resistor 70 to constitute the signal Vw+.

Figure 3:
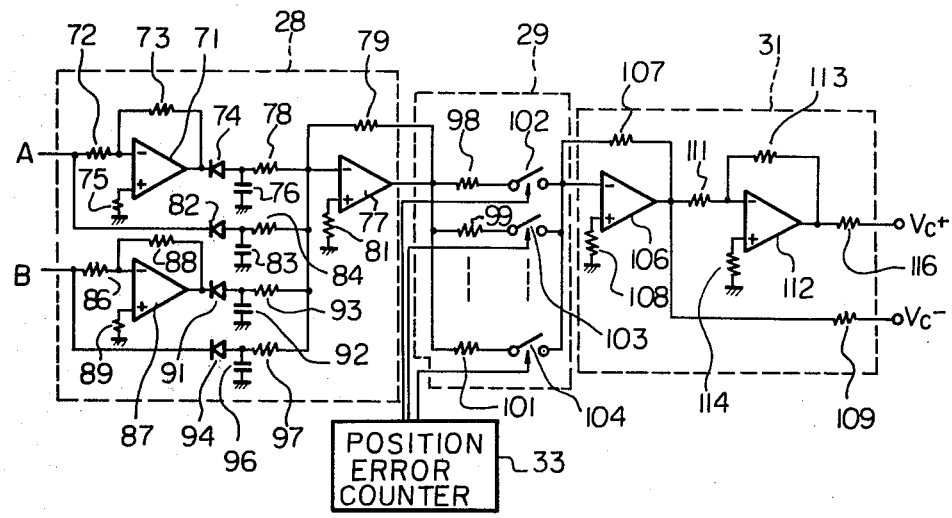
FIG. 3 is an electrical schematic diagram of rectifying, peak detecting, summing and command velocity signal generating means of the present apparatus.

Referring now to FIG. 3, it will be seen that the reference signal generator 28 comprises an operational amplifier 71. The signal A is fed through an input resistor 72 to the inverting input of the operational amplifier 71. The output of the operational amplifier 71 is connected to the inverting input thereof through a feedback resistor 73. The non-inverting input of the operational amplifier 71 is grounded through a resistor 75. The output of the operational amplifier 71 is connected to the cathode of a diode 74, the anode of which is grounded through a capacitor 76. The anode of the diode 74 is also connected to the inverting input of an operational amplifier 77 through an input resistor 78. The output of the operational amplifier 77 is connected through a feedback resistor 79 to the inverting input thereof. The non-inverting input of the operational amplifier 77 is connected through a resistor 81 to ground.

The signal A is also applied to the cathode of a diode 82, the anode of which is connected to ground through a capacitor 83. The anode of the diode 82 is also connected to the inverting input of the operational amplifier 77 through an input resistor 84.

The signal B is fed through an input resistor 86 to the inverting input of an operational amplifier 87. The output of the operational amplifier 87 is connected to the inverting input thereof through a feedback resistor 88. The non-inverting input of the operational amplifier 87 is grounded through a resistor 89. The output of the operational amplifier 87 is connected to the cathode of a diode 91, the anode of which is grounded through a capacitor 92. The anode of the diode 91 is also connected to the inverting input of the operational amplifier 77 through an input resistor 93.

The signal B is also applied to the cathode of a diode 94, the anode of which is connected to ground through a capacitor 96. The anode of the diode 94 is also connected to the inverting input of the operational amplifier 77 through an input resistor 97.

The output of the operational amplifier 77 is connected through resistors 98, 99 and 101 and switches 102, 103 and 104 which are connected in series with the resistors 98, 99 and 101 respectively to the inverting input of an operational amplifier 106. The output of the operational amplifier 106 is connected through a feedback resistor 107 to the inverting input thereof. The non-inverting input of the operational amplifier 106 is connected to ground through a resistor 108. The output of the operational amplifier 106 is connected through a resistor 109 to constitute the signal Vc−.

The output of the operational amplifier 106 is connected through an input resistor 111 to the inverting input of an operational amplifier 112. The output of the operational amplifier 112 is connected through a feedback resistor 113 to the inverting input thereof. The non-inverting input of the operational amplifier 112 is connected to ground through a resistor 114. The output of the operational amplifier 112 is fed through a resistor 116 to constitute the signal Vc+.

The signals A and B are half wave rectified by the diodes 82 and 94 and charge the capacitors 83 and 96 respectively. The capacitors 83 and 96 charge up to the negative peaks of the rectified signals A and B respectively. The signals A and B are inverted by the operational amplifiers 71 and 87 and half wave rectified by the diodes 74 and 91 respectively. The inverted and rectified signals A and B charge the capacitors 76 and 92 respectively. More specifically, the capacitors 76 and 92 charge to the negative peaks of the output signals of the operational amplifiers 71 and 87 which correspond to the positive peaks of the signals A and B respectively. Preferably, the values of the resistors 72, 73, 86 and 88 are equal so that the operational amplifiers 71 and 87 are operated at an amplification factor of unity.

The operational amplifier 77 is operated as an inverting summing amplifier and sums the signals applied thereto through the resistors 78, 84, 93 and 97. It will be understood that the diodes and capacitors 74, 76; 82, 83; 91, 92; and 94, 96 function as peak detectors since the capacitors 76, 83, 92 and 96 charge to the peaks of the applied signals.

The operational amplifier 77 produces the reference signal Vr which has the following magnitude $$Vr = -\left[ V1 \frac{R79}{R78} + V2 \frac{R79}{R84} + V3 \frac{R79}{R93} + V4 \frac{R79}{R97} \right]$$

where V1, V2, V3 and V4 are the signals applied to the inverting input of the operational amplifier 77 through the resistors 78, 84, 93 and 97 respectively.

The magnitude of the reference signal Vr is an average value of the peak signals where R78=R84=R93=R97 and R79 =(¼)R78. The signal Vr reflects any variations in the signals A and B in the manner described above.

The switches 102, 103 and 104 are controlled by the counter 33. More than three switches may be provided in series with appropriate resistors although only three sets are illustrated. When the actual shaft position is far from the command position the counter 33 closes all of the switches 102, 103 and 104 to connect all of the resistors 98, 99 and 101 in parallel between the output of the operational amplifier 77 and the input of the operational amplifier 106. In this case, the input resistance of the operational amplifier 106 is minimum and the amplification factor thereof is maximum. Thus, the reference signal is amplified by a maximum amount by the operational amplifier 106 to produce a maximum velocity command signal. The signal is fed through the resistor 109 to constitute the signal Vc− and inverted by the operational amplifier 112 and fed through the resistor 116 to constitute the signal Vc+.

As the motor shaft 12a approaches the command position the counter 33 opens the switches 102, 103 and 104 one by one until at the command position all of the switches 102, 103 and 104 are open. The input resistance of the operational amplifier 106 progressively increases and the amplification factor thereof decreases. Thus, the reference signal is amplified by the operational amplifier 106 to a progressively smaller extent and the magnitudes of the signals Vc+ and Vc− progressively decrease. With all of the switches 102, 103 and 104 open the input resistance of the operational amplifier 106 is infinite and the output thereof is zero.

Although the switches 102, 103 and 104 are illustrated as being mechanical and being controlled directly by the counter 33, this is only for simplicity of illustration and description. In an actual embodiment the switches 102, 103 and 104 are constituted by electronic switches and suitable logical circuitry provided between the counter 33 and switches 102, 103 and 104 for actuating the same.

In summary, it will be seen that the present invention provides a servo positioning apparatus which is much more stable and precise than prior apparatus known heretofore. Various modifications will become possible for those skilled in the art after receiving the teachings of the present disclosure without departing from the scope thereof.

What is claimed is:

1. A servo positioning apparatus including a servo motor having a rotary shaft, transducer means for producing first and second periodic signals in response to rotation of the shaft, the first and second signals being substantially 90° out of phase with each other, first and second differentiating means for differentiating the first and second signals, first and second full wave rectifying means for rectifying the differentiated first and second signals and summing means for summing the differentiated and rectified first and second signals to produce a velocity signal having a magnitude corresponding to a rotational velocity of the shaft, characterized by comprising:

position command means for generating a position signal having a magnitude corresponding to a difference between a present shaft position and a command shaft position;

reference means for sampling peaks of the first and second signals and producing a reference signal having a magnitude corresponding thereto;

velocity command means for reducing the magnitude of the reference signal in accordance with the magnitude of the position signal to produce a velocity command signal; and comparator means for comparing the velocity signal with the velocity command signal and producing a motor drive signal corresponding to a difference therebetween, the motor being energized for shaft rotation by the drive signal.

2. An apparatus as in claim 1, in which the reference means is constructed to rectify the first and second signals before sampling the peaks thereof.

3. An apparatus as in claim 1, in which the reference means comprises first and second rectifying means for rectifying the first and second signals, first and second peak detector means for detecting peaks of the rectified first and second signals and producing output signals corresponding thereto, first and second inverters for inverting the first and second signals, third and fourth rectifying means for rectifying the inverted first and second signals, third and fourth peak detector means for detecting peaks of the inverted and rectified first and second signals and producing output signals corresponding thereto and summing amplifier means connected to receive the output signals of the first, second, third and fourth peak detector means.

4. A servo positioning apparatus including a servo motor having a rotary shaft, transducer means for producing first and second periodic signals in response to rotation of the shaft, the first and second periodic signals being 90° out of phase with each other and first and second differentiating means for differentiating the first and second signals, characterized by comprising:

first and second full wave rectifying means for directly full wave rectifying the differentiated first and second signals; and summing means for summing the differentiated and rectified first and second signals to produce a velocity signal having a magnitude corresponding to a rotational velocity of the shaft.

* * * * *